Aug. 15, 1939.   W. A. SMITH, JR   2,169,887
VALVE FOR ROCK DRILLS
Filed Sept. 30, 1938
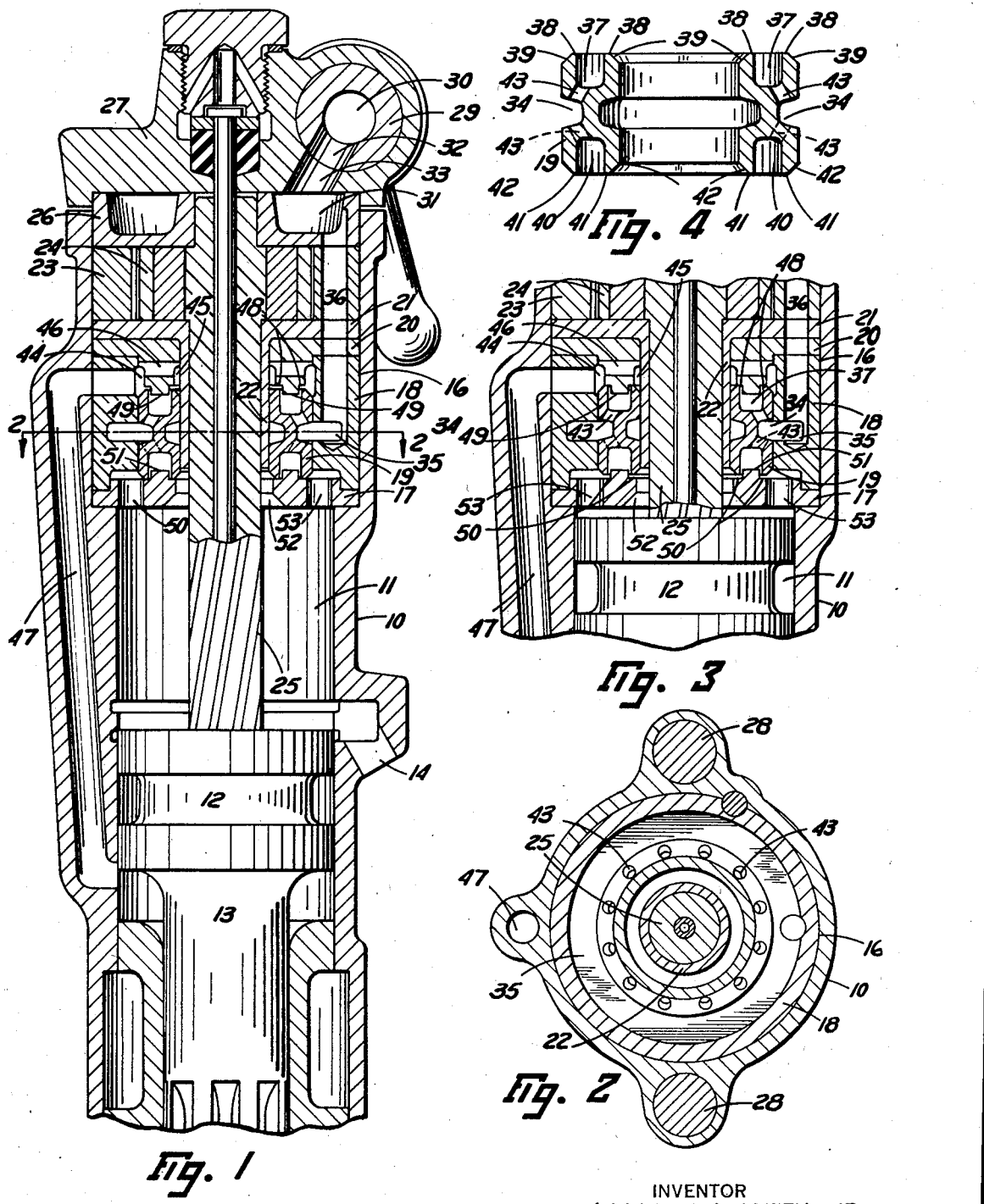
INVENTOR
WILLIAM A. SMITH JR.
BY
ATTORNEY Patented Aug. 15, 1939

2,169,887

UNITED STATES PATENT OFFICE 2,169,887

VALVE FOR ROCK DRILLS

William A. Smith, Jr., Cleveland, Ohio, assignor to The Cleveland Rock Drill Company, Cleveland, Ohio, a corporation of Ohio Application September 30, 1938, Serial No. 232,548

6 Claims. (Cl. 121—19)

This invention relates broadly to fluid actuated rock drills, but more particularly to a motive fluid distributing valve therefor.

One object of this invention is to produce a rock drill with an efficient motive fluid distributing valve which is simple in construction and readily responsive to the action of the motive fluid.

Another object of this invention is to produce a valve for rock drills capable of rapid and efficient distribution of the motive fluid resulting in the fast reciprocation of the piston.

Other objects and advantages more or less ancillary to the foregoing and the manner in which the various objects are attained reside in the specific construction and aggroupment of the elements peculiar to this structure, as will become apparent from a more complete examination of this specification, in the claims of which there are assembled certain specific combinations of parts and specific constructions indicative of the scope and spirit of the invention.

In the drawing:

Fig. 1 is a longitudinal sectional view of a portion of a rock drill illustrating the invention.

Fig. 2 is a cross sectional view taken in a plane indicated by the line 2—2 in Fig. 1.

Fig. 3 is a partial longitudinal sectional view showing the parts in a different position.

Fig. 4 is a longitudinal sectional view of the valve.

Referring to the drawing, 10 represents a cylinder formed with a piston chamber 11 having a piston 12 reciprocable therein, which piston includes a splined stem 13 capable of delivering impacts to the drill steel in the usual manner. Intermediate its ends the cylinder 10 is provided with the usual exhaust port 14.

The rear end of the cylinder 10 is formed with a counterbore 16 having disposed therein a valve assembly including a plate 17 resting on the bottom of the counterbore 16, a valve block 18 having a sleevelike valve 19 reciprocable therein, and a valve cap 20. Supported by the valve cap 20, there is a plate 21 having a sleeve 22 depending therefrom and extending through the cap 20 and valve block 18 to serve as a bushing on which the valve 19 is free to slide.

Also located within the counterbore 16, there is the usual rotation mechanism including a stationary ratchet ring 23 having rotatable therein the head 24 of a rifle bar 25, which bar extends through the bushing 22 into the piston 12 for operative engagement with a corresponding nut (not shown). The head 24 of the rifle bar 25 is maintained within the ratchet ring 23 by a bearing plate 26 held in position by a back head 27 which is rigidly secured to the cylinder 10 by two bolts 28.

Rotatable within the back head 27, there is a throttle valve 29 formed with a central bore 30 having motive fluid admitted therein from any suitable source, which central bore is capable of communication with a large recess 31 in the bearing plate 26 through a throttle valve port 32 and a port 33 formed in the back head 27.

Referring now more particularly to the valve assembly, the valve 19 intermediate its ends is formed with a peripheral chamber 34 in constant communication with an annular groove 35 provided within the valve block 18, which groove communicates with the large recess 31 in the bearing plate 26 through one or more passageways 36. Cut into the upper end wall of the valve 19, there is a circular groove 37 transforming the upper end wall of the valve into two annular lands 38 constituting holding areas for the valve, and formed with bevel edges 39 constituting shifting areas as will be explained later. The lower end of the valve is also provided with a circular groove 40 and two annular lands or holding areas 41 having bevel edges forming shifting areas 42. The circular recesses 37 and 40 communicate with the peripheral grooove 34 through ports 43.

The valve cap 20 projects part way into the valve block 18, where it is spaced therefrom to form an annular groove 44, and similarly spaced from the bushing 22 to form an annular groove 45 in communication with the groove 44 through radial ports 46, while the groove 44 is in constant communication with the front end of the piston chamber 11 via one or more passageways 47. Travel of the valve in the upward direction is limited by the engagement of the valve upper lands 38 with valve seats 48 formed on the cap 20, which forms therewith together with an annular rib 49 provided thereon and extending into the valve groove 37, two circular passageways enabling the flow of the motive fluid from the valve circular groove 37 into the passageway 47 via the grooves 44 and 45, and the ports 46. Travel of the valve in the downward direction is limited by the engagement of the valve lower lands 41 with valve seats 50 provided on the plate 17, forming therewith together with an annular rib 51 provided thereon and extending into the valve groove 40, two circular passageways enabling the flow of the motive fluid from a valve groove 40 into the rear end of the piston chamber ber 11 via a central passage 52 and several ports 53 provided through the plate 17.

In the operation of the valve, if the parts are positioned as shown in Fig. 1, motive fluid admitted into the throttle valve bore 30 will flow into the valve peripheral chamber 34 via the ports 32 and 33, the annular recess 31, the passageway 36 and the annular groove 35. From the peripheral chamber 34, the motive fluid will flow into the valve circular grooves 37 and 40 via the ports 43, from which grooves the motive fluid is ready to be distributed into the ends of the piston chamber 11. With the valve 19 in the position shown in Fig. 1, admission of the motive fluid into the upper end of the piston chamber 11 is prevented by the engagement of the valve lower lands 41 with the valve seats 50, while the motive fluid from the valve circular groove 37 will flow through the two circular passageways formed between the upper end of the valve and the valve cap 20 into the annular grooves 44 and 45, and therefrom into the lower end of the piston chamber 11 via the passageway 47. As the motive fluid flows into the grooves 44 and 45, it will exert pressure on the valve upper lands or holding areas 38 and on the shifting areas 39 for momentarily holding the valve in open position relative to the lower end of the piston chamber 11, wherein motive fluid is now admitted for driving the piston 12 upwardly.

During its upward stroke, the piston 12 will cover the exhaust port 14 and thereafter compress any remaining air in the upper end of the piston chamber 11, thereby exerting pressure on the bevel edges or shifting areas 42 of the valve lower lands 41 through the central passage 50 and ports 51, which pressure will tend to shift the valve into the position shown in Fig. 3. As the piston 12 proceeds upwardly, it will again uncover the exhaust port 14 and enable the motive fluid admitted into the lower end of the piston chamber 11 to exhaust to the atmosphere, thereby causing a drop of pressure within the lower end of the piston chamber and on the upper end of the valve or valve areas 38 and 39. This drop of pressure together with the action of the air compressed within the upper end of the piston chamber 11 and acting on the valve shifting areas 42, will cause shifting of the valve into the position shown in Fig. 3.

In this new position of the valve, admission of the motive fluid into the lower end of the piston chamber 11 is prevented by the engagement of the valve upper lands 38 with the valve seats 48, while the motive fluid from the valve circular groove 40 will flow through the two circular passageways formed between the lower end of the valve and the plate 17 into the upper end of the piston chamber 11 via the central port 50 and the ports 51. During this flow of the motive fluid, pressure will be exerted on the lower lands or holding areas 41 of the valve, and on the shifting areas 42 for momentarily holding the valve open relative to the upper end of the piston chamber 11, wherein motive fluid is admitted into the upper end of the piston chamber 11 for driving the piston downwardly.

During its downward stroke, the piston 12 will cover the exhaust port 14 and thereafter compress any remaining air in the lower end of the piston chamber 11, thereby exerting pressure on the bevel edges or shifting areas 39 of the valve upper lands 38, which pressure will tend to shift the valve into the position shown in Fig. 1. As the piston 12 proceeds downwardly, it will again uncover the exhaust port 14 and enable the motive fluid admitted into the upper end of the piston chamber 11 to exhaust to the atmosphere, thereby causing a drop of pressure within the upper end of the piston chamber and on the lower end of the valve or valve areas 41 and 42. This drop of pressure together with the action of the air compressed within the lower end of the piston chamber 11 and acting on the valve upper shifting areas 39, will cause shifting of the valve into the position shown in Fig. 1 to complete the cycle.

From the foregoing description, it will be understood that due to the two circular passageways formed at each end of the valve through which the motive fluid is free to flow into the piston chamber 11, the actual stroke of the valve can be materially reduced without affecting the amount of motive fluid supplied to the piston, thereby resulting in the fast reciprocation of the piston for delivering a rapid succession of powerful impacts to the drill steel.

Although the foregoing description is necessarily of a detailed character, in order to completely set forth the invention, it is to be understood that the specific terminology is not intended to be restrictive or confining and it is to be further understood that various rearrangements of parts and modifications of structural detail may be resorted to without departing from the scope or spirit of the invention as herein claimed.

I claim:

1. In a fluid actuated rock drill, the combination of a cylinder and a piston reciprocable therein, a valve block having a valve chamber, front and rear inlet passages leading from said chamber to the ends of said cylinder, a sleeve-like valve reciprocable within said chamber to control said passages, a circular groove within each end wall of said valve having motive fluid constantly admitted therein and forming a pair of annular lands on each end of said valve, valve seats within said chamber engageable by said lands to control the admission of the motive fluid into the ends of said cylinder, said lands formed with shifting areas for said valve subjected to pressure conditions within said cylinder for shifting said valve into operative engagement with one or the other of said valve seats, and holding areas for said valve formed by each pair of said lands alternatively subjected to the motive fluid flowing into said cylinder for momentarily holding said valve in said operative engagement.

2. In a fluid actuated rock drill, the combination of a cylinder and a piston reciprocable therein, a valve block having a valve chamber, a sleeve-like valve reciprocable within said chamber, passages through said valve admitting motive fluid into said chamber, a pair of inlet circular passageways adjacent each end of said valve each pair adapted to be alternatively open and closed by the adjacent end of said valve, fluid conveying passages leading from said passageways to the ends of said cylinder, shifting areas on each end of said valve subjected to pressure conditions within said cylinder for shifting said valve into open position alternatively relative to each pair of said passageways, and holding areas on the ends of said valve alternatively subjected to the motive fluid flowing into said cylinder for momentarily holding said valve in open position relative to one or the other of said passageways.

3. In a fluid actuated rock drill, the combination of a cylinder and a piston reciprocable therein, a valve block having a valve chamber, a sleeve-like valve reciprocable within said chamber, passages through said valve admitting motive fluid into said chamber, a pair of inlet circular passageways adjacent each end of said valve each pair being alternatively open and closed by the adjacent end of said valve, inlet passages admitting motive fluid from said passageways into the ends of said cylinder, the ends of said valve being subjected to pressure conditions within said cylinder for shifting said valve into open position alternatively relative to each pair of said passageways, and opposed holding areas on said valve alternatively subjected to the motive fluid admitted into said valve chamber for momentarily holding said valve in open position relative to one or the other of said passageways.

4. In a fluid actuated rock drill, the combination of a cylinder and a piston reciprocable therein, a valve block having a valve chamber, front and rear inlet passages leading from said chamber to the ends of said cylinder, a sleevelike valve reciprocable within said chamber, a pair of annular lands on each end of said valve having motive fluid constantly admitted therebetween and capable of flowing thereover into the ends of said cylinder via one or the other of said inlet passages, valve seats within said valve chamber engageable by said lands for controlling said inlet passages, said lands forming holding areas subjected to the action of the motive fluid flowing thereover for momentarily holding said valve in open position relative to one or the other of said inlet passages, and a shifting area adjacent each of said lands subjected to pressure conditions within said cylinder for shifting said valve into open position alternatively relative to said front and rear inlet passages.

5. In a fluid actuated rock drill, the combination of a cylinder and a piston reciprocable therein, a valve block having a valve chamber, a sleevelike valve reciprocable within said chamber, a pair of annular lands on each end of said valve having motive fluid constantly admitted therebetween and capable of flowing thereover, an inlet passage for each of said lands leading therefrom into the cylinder, opposed valve seats within said chamber one engageable by one pair of said lands and the other by the other pair thereof for controlling said inlet passages, said lands forming holding areas subjected to the action of the motive fluid flowing thereover for momentarily holding said valve in operative engagement with one or the other of said valve seats, and a shifting area adjacent each of said lands subjected to pressure conditions within said cylinder for shifting said valve into operative engagement with one or the other of said valve seats.

6. In a fluid actuated rock drill, the combination of a cylinder and a piston reciprocable therein, of a rotation mechanism for said piston including a rifle bar, a valve block having a valve chamber, front and rear inlet passages leading from said chamber to the ends of said cylinder, a sleevelike valve reciprocable within said chamber having said rifle bar extending therethrough, a valve bushing between said rifle bar and valve on which the valve is free to slide, motive fluid conveying passageways within said valve leading to each end of the valve for supplying motive fluid to one or the other of said inlet passages, valve seats within said valve chamber engageable by the ends of said valve for controlling said motive fluid conveying passageways, the ends of said valve forming holding areas subjected to the action of the motive fluid from said passageways for momentarily holding said valve in open position relative to one or the other of said passageways, and a shifting area adjacent each end of said valve subjected to pressure conditions within said cylinder for shifting said valve into open position relative to one or the other of said passageways.

WILLIAM A. SMITH, Jr.